Sept. 19, 1939.                G. H. ELLIS                2,173,391
                PROCESS OF MANUFACTURING FIBROUS PRODUCTS
                        Filed Nov. 27, 1935
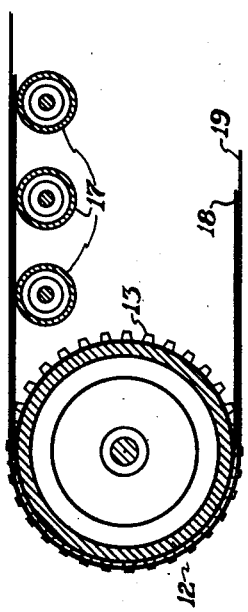
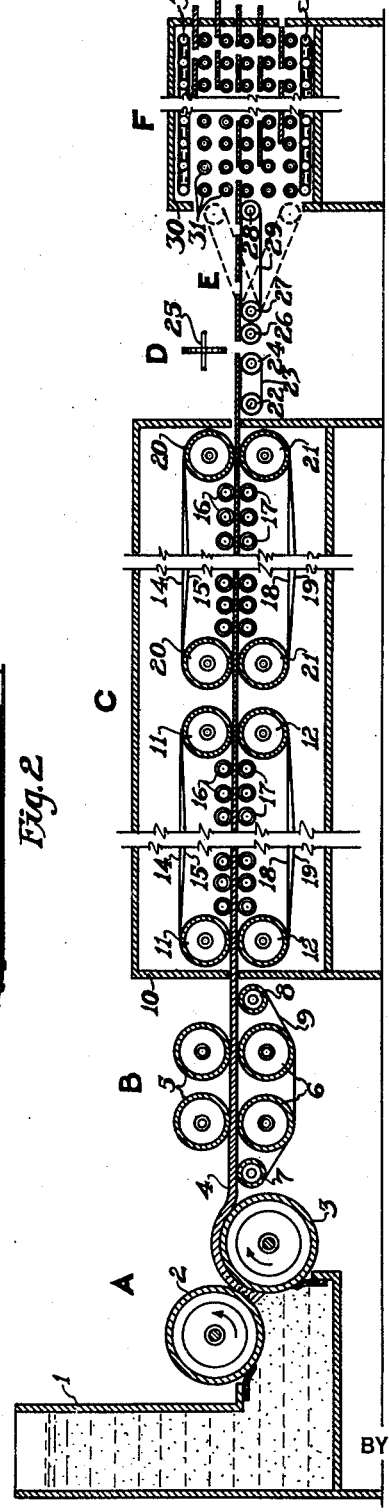
INVENTOR
GEORGE H. ELLIS
BY
ATTORNEY Patented Sept. 19, 1939

2,173,391

UNITED STATES PATENT OFFICE 2,173,391

PROCESS OF MANUFACTURING FIBROUS PRODUCTS

George H. Ellis, New Brighton, Minn., assignor to The Insulite Company, Minneapolis, Minn., a corporation of Minnesota Application November 27, 1935, Serial No. 51,831

3 Claims. (Cl. 92—39)

This invention relates to the manufacture of board, sheet, panels, and other fibrous articles or bodies and the handling of such articles or bodies during the process of manufacture.

An object of the invention is to provide an improved method and apparatus by which such articles or bodies may be produced efficiently, economically, and continuously.

The products formed by the particular method and apparatus disclosed in the present application are board-like bodies composed in whole or in part of felted fibrous material. The process includes the formation of the board or sheet of fibrous material from a liquid fiberized mass, the transfer of the sheet to a hot press, and thereafter to a heat curing chamber.

Many kinds of vegetable fiber are available for use in this process and in general it may be said that all vegetable material which can be reduced to a fiberized condition may be used, and the raw material may be fiberized in any desired manner.

In carrying out the process the raw vegetable material is disintegrated so as to separate the fibers. The material so divided is mixed with water, which is then by a suitable apparatus formed into the desired article or body. The formed sheet or body is passed through a machine to remove the surplus moisture.

To obtain greater strength and/or water resistance, a binder and/or water-proofing material is incorporated in the fibrous product. Usually the waterproofing material is commingled with the fibrous material while in a water bath.

If a fungi and insect resisting product is desired, some toxic agent or agents should be incorporated in the products. Of the binders from an extraneous source the best results are obtained by using condensation product of the class that hardens under heat and pressure. The most economical binder is liquid phenol-formaldehyde because this material gives added strength, greater water-resisting properties, and insect and fungi-resisting characteristics as well.

With the foregoing and other objects in view, the invention consists of the novel construction, combination, and arrangement of parts hereinafter specifically described and illustrated in the accompanying drawing wherein is shown one embodiment of the invention; the novel steps of the process and the products, but it is to be understood that changes, variations and modifications may be resorted to which fall within the scope of the appended claims.

In the accompanying drawing:

Figure 1 is a sectional view showing the apparatus for making fibrous products; and Figure 2 is a view of one of the pressing elements with parts broken away.

The apparatus disclosed by Figure 1 includes board-forming device A, a wet machine B, a pressing apparatus C, cut off device D, a tipple apron E, and a heat curing chamber F.

The head box, 1, is provided with a suitable fiberized stock in a water bath. The pulp is delivered to foraminous rolls, 2 and 3, to form a sheet or board 4. The board is delivered to a wet machine and moved therethrough by an endless conveyor. The wet machine includes rolls 5 and 6, and endless belt 9, rotatable, mounted on rolls 7 and 8.

In a suitable housing, 10, is operatively mounted pressing members. The pressing members are heated or the product is heated by any suitable means. Any known heating agency may be employed, steam, oil, gas or electrical heaters or by other means. As these are known means and appliances, it is deemed unnecessary to illustrate or describe in detail the heating means.

The pressing means preferably consist of a series of rotatable mounted rolls, 16 and 17. The rolls may be positively driven or mounted for free movement. The means for driving rolls disclosed in my Patent No. 1,959,662 is preferably used for rotating the rolls. On roller members, 11, 12, 20 and 21 are operatively mounted belts, 15 and 18. Generally it is preferred that foraminous members, 14 and 19, be operatively mounted on the belts, 15 and 18. The rolls 11, 12, 20 and 21 are adapted to be driven by any suitable means.

The board or sheet is delivered from the pressing operation to a conveyor. In this instance an endless conveyor composed of rollers 22 and 24 and endless belt, 23. The conveyor may be of any suitable type desired. The sheet is divided into the desired size by cutting member 25. It is to be understood that the sheet may be cut prior to introduction into the hot press.

A tipple apron is mounted adjacent the cut off means and includes an endless belt or the like, 29, rotatably mounted on rolls, 27 and 28. The tipple apron is positively driven and is adapted to deliver the boards to a heat curing chamber, 30.

In the curing oven is rotatably mounted conveyor rolls, 31. The curing oven is heated in any suitable manner, for instance by steam heaters, 32 and 33. The products when discharged from the curing oven may be transferred by any suitable means (not shown) to points for shipment.

It has been discovered that a series of pressing members spaced relatively close together produces better products and provides a more economical operation. In Figure 1 there is disclosed two pressing members wherein each pressing member includes a series of upper and lower rotatable members. The pressing passages are arranged adjacent each other but the passages are spaced so that the pressure on the board is released between each passage.

The process may be carried out in the following manner: Raw fiberized vegetable in a water bath having commingled therewith liquid phenol-formaldehyde within the range of 3 to 10% is manipulated to form a board or sheet. The sheet is passed to a wet machine to remove the surplus moisture. The sheet is then passed to the hot pressing operation where pressure within the range of 10 to 50 pounds per lineal inch is applied and a temperature within the range of 600° F. to 1200° F. is applied. It is preferred that the sheet be discharged from the hot pressing operation containing moisture within the range of 4% to 20%. The sheet is then cut into desired size and fed to the curing oven where they are subjected to heat treatment at a temperature above 212° F.

During the hot pressing operation it is preferred that the temperature decrease as the moisture contents decrease and that the pressure increase as the moisture contents decrease. It is to be understood that a substantially constant temperature and pressure may be used.

The operation is continuous from the time the product is formed until the product is finished.

The amount of moisture in the product at the time it is subjected to heat and pressure may vary over considerable range but for economical operation a moisture contents of approximately 50% is desirable.

A screen need not be used on both the major faces of the board, this, of course, depending upon the desired characteristics of the finished product.

Numerous modifications or variations in the arrangement of parts may obviously be made without departing from the scope of the invention.

What I claim is:

1. A process for producing a stiff, homogeneous, board-like body including simultaneously applying heat and pressure to a moist vegetable fiber board, the initial temperature being greater than 600° F. said heat progressively decreasing as the moisture content decreases and said pressure progressively increasing as the moisture content decreases.

2. A process of manufacturing board-like fibrous products which includes simultaneously applying heat and pressure to a moist vegetable fiber board, the initial temperature being of the order of about 600° F. to 1200° F., said heat progressively decreasing as moisture contents of the moist board decrease and the said pressure progressively increasing as the moisture contents decrease.

3. The process of manufacturing board-like products which includes forming board from vegetable fibrous material in a water bath having commingled therewith a binder that hardens under heat and pressure, simultaneously applying heat and pressure to the moist fiber board, the initial temperature being of the order of about 600° F. to 1200° F., said heat progressively decreasing as the moisture content decreases and said pressure progressively increasing as the moisture content decreases.

GEORGE H. ELLIS.